United States Patent
Chenaud et al.

(10) Patent No.: US 11,046,254 B2
(45) Date of Patent: Jun. 29, 2021

(54) DEVICE FOR RAISING ROOF BARS

(71) Applicant: NOVARES France, Clamart (FR)

(72) Inventors: David Chenaud, Bellignat (FR);
Guillaume Huguet, Nivigne et Suran (FR)

(73) Assignee: NOVARES FRANCE, Clamart (FR)

(*) Notice: Subject to any disclaimer, the term of this patent is extended or adjusted under 35 U.S.C. 154(b) by 0 days.

(21) Appl. No.: 16/608,503

(22) PCT Filed: Apr. 24, 2018

(86) PCT No.: PCT/FR2018/051014
§ 371 (c)(1),
(2) Date: Oct. 25, 2019

(87) PCT Pub. No.: WO2018/197796
PCT Pub. Date: Nov. 1, 2018

(65) Prior Publication Data
US 2020/0189479 A1    Jun. 18, 2020

(30) Foreign Application Priority Data
Apr. 25, 2017 (FR) .................... 17/53591

(51) Int. Cl.
*B60R 9/058* (2006.01)
*B60R 9/045* (2006.01)

(52) U.S. Cl.
CPC ............. *B60R 9/058* (2013.01); *B60R 9/045* (2013.01)

(58) Field of Classification Search
CPC .......... B60R 9/045; B60R 9/052; B60R 9/058
See application file for complete search history.

(56) References Cited

U.S. PATENT DOCUMENTS

| 4,364,500 A | 12/1982 | Bott |
| 7,926,686 B2* | 4/2011 | Salvador ................. B60R 9/045 |
| | | 224/321 |
| 2008/0252100 A1 | 10/2008 | Salvador et al. |

(Continued)

FOREIGN PATENT DOCUMENTS

| EP | 1470960 A1 * | 10/2004 | ............. B60R 9/045 |
| FR | 2980423 A1 * | 3/2013 | ............. B60R 9/058 |

OTHER PUBLICATIONS

International Search Report for Application No. PCT/FR2018/051014.
Written Opinion for Application No. PCT/FR2018/051014.

*Primary Examiner* — Scott T McNurlen
(74) *Attorney, Agent, or Firm* — Cantor Colburn LLP

(57) ABSTRACT

The invention concerns a roof bar assembly (1) comprising a bar, several feet (2) for attaching the bar (6) to the roof of a vehicle and several screws (90) for attaching the bar (6) to each corresponding foot (2). The bar (6) can be attached in a longitudinal position in which the bar (6) is parallel to a longitudinal axis of the vehicle or in a transverse position in which the bar (6) is perpendicular to the longitudinal axis of the vehicle. The roof bar assembly (1) comprises spacer means positioned between each foot (2) and the bar (6) configured such that, in the transverse position, the distance between an attachment plate (21) of the foot (2) intended to be attached to the roof and the bar (6) is greater than the distance between the attachment plate of the foot (2) and the bar (6) in the longitudinal position.

18 Claims, 8 Drawing Sheets

(56) References Cited

U.S. PATENT DOCUMENTS

2009/0321485 A1* 12/2009 Jamieson ................ B60R 9/04
224/309
2016/0243994 A1 8/2016 Kmita
2018/0201199 A1* 7/2018 Aftanas ................ B60R 9/052

* cited by examiner

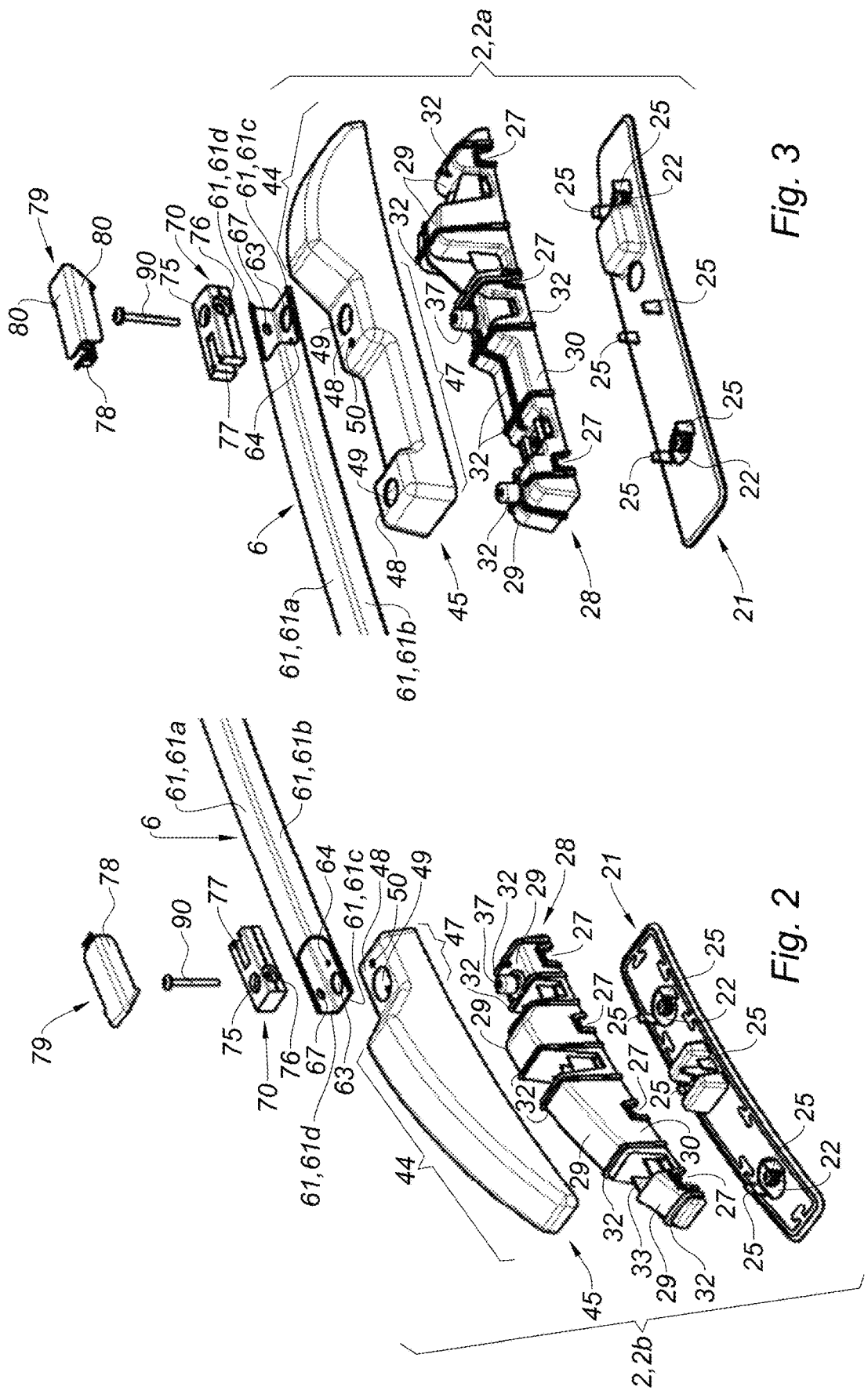

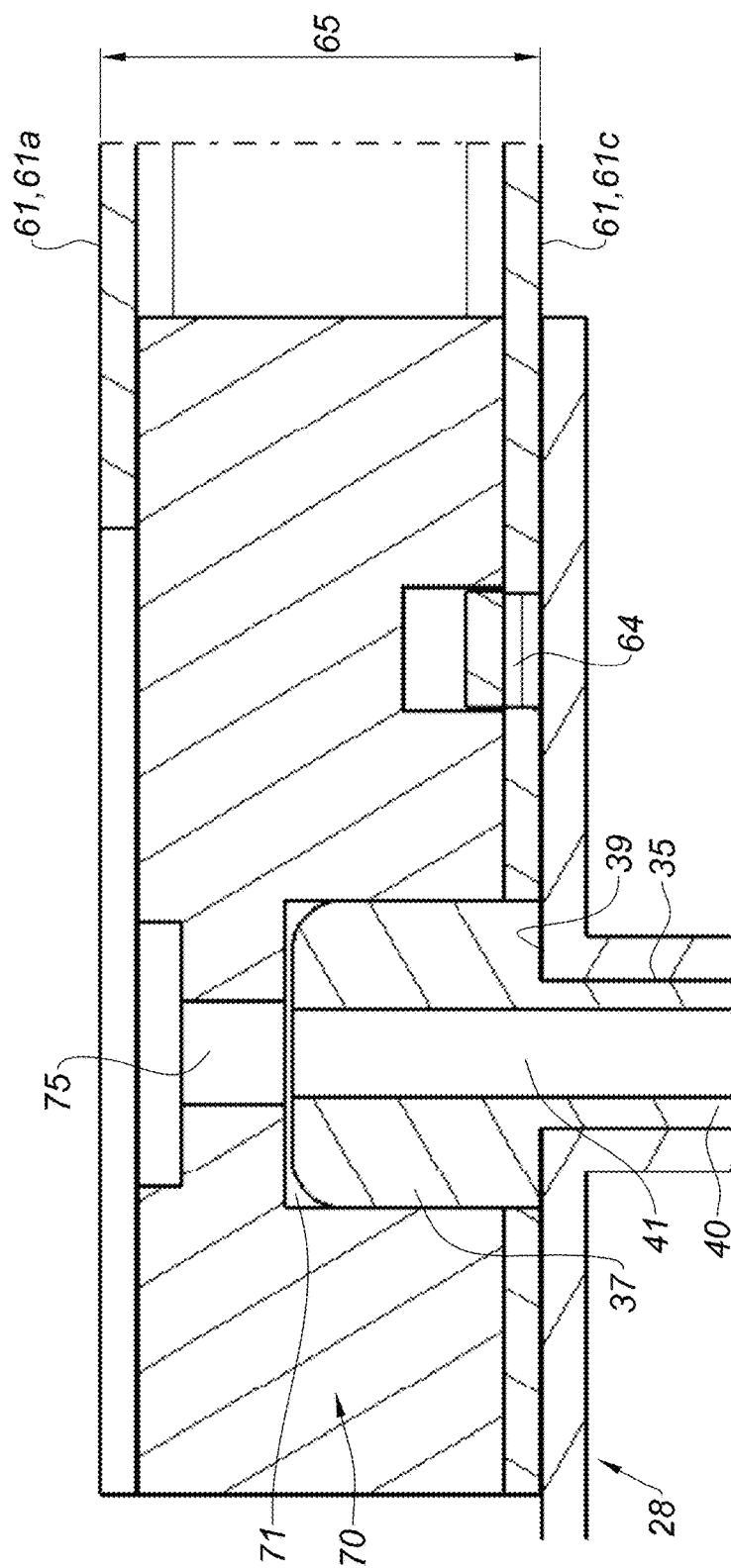
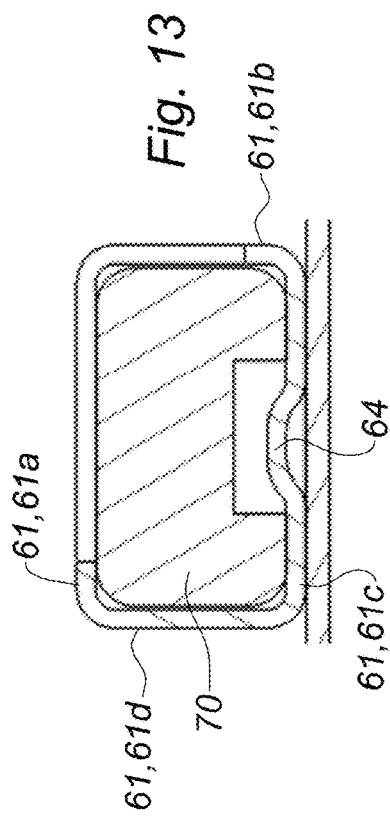

DEVICE FOR RAISING ROOF BARS

CROSS REFERENCE TO RELATED APPLICATIONS

This application is a National Stage of PCT Application No. PCT/FR2018/051014 filed on Apr. 24, 2018, which claims priority to French Patent Application No. 17/53591 filed on Apr. 25, 2017, the contents each of which are incorporated herein by reference thereto.

TECHNICAL FIELD

The present invention concerns a roof bar assembly intended to be positioned on the roof of a vehicle.

BACKGROUND

It is known to use roof bars for supporting, for example, a roof box or a bike carrier on the roof of a vehicle.

Most often, the transverse roof bars are hung on longitudinal bars fastened to the vehicle. The fastening of the transverse roof bars to the longitudinal bars is often performed by means of a screw-nut assembly traversing the transverse roof bar and the longitudinal bar. Similarly, it is known to use adjustable jaws positioned at each end of the transverse roof bar and configured to each clamp a longitudinal bar. To maintain the aerodynamics of the vehicle it is necessary that in the longitudinal position the roof bars are close to the roof. Conversely, it is necessary that in the transverse position the roof bars are further away from the roof (in a direction normal to the roof plane) in order to allow the passage of a system for hooking an accessory.

A known solution from document US2016243994 consists in using pivoting roof bars, on a rail, between a longitudinal position and a transverse position. When switching in the transverse position, the feet of the roof bar fold to raise it. This solution requires the presence of a rail on the roof of the vehicle, which weighs down the roof bar and, eventually, increases the energy consumption of the vehicle on which the roof bar is installed. In addition, this solution uses a hinge that can collapse under a heavy load.

BRIEF SUMMARY

Consequently, the purpose of the present invention is to provide a roof bar assembly that can pivot while allowing the distance between the roof and the roof bar to be varied, using a simple, lightweight and robust mechanism.

According to a general definition, the invention concerns a roof bar assembly comprising a bar, several feet for fastening the bar to the roof of a vehicle and several screws for fastening the bar to each corresponding foot. The bar can be fastened in a longitudinal position in which the bar is parallel to a longitudinal axis of the vehicle or in a transverse position in which the bar is perpendicular to the longitudinal axis of the vehicle. The roof bar assembly comprises spacer means positioned between each foot and the bar configured so that in the transverse position, the distance between a foot fastening platen intended to be fastened to the roof and the bar is larger than the distance between the foot fastening platen and the bar in the longitudinal position.

The spacer means allow the distance between the bar and the roof of the vehicle to be varied. Thus, in the longitudinal position the bar is close to the roof, which promotes the aerodynamics of the vehicle. In the transverse position, the spacer means allow raising the bar in order to allow hooking an accessory such as for example a roof box or a ski carrier.

Thus, the invention provides a roof bar assembly that can pivot while allowing the distance between the roof and the roof bar to be varied, using a simple, lightweight and robust mechanism.

The spacer means comprise a spacer positioned on the foot and an insert connected to the bar. The insert has a bore adapted to receive the spacer when the bar is in the longitudinal position, a first drilling opening into the bore for receiving the screw for fastening the bar in the longitudinal position and a second opening drilling whose diameter is smaller than that of the spacer for receiving the screw for fastening the bar in the transverse position.

According to a particular arrangement, the spacer can have a helical thread adapted to cooperate with a complementary helical thread of the foot to allow adjusting the distance between the foot fastening platen and the bar in the transverse position.

The first opening drilling can be perpendicular to the second opening drilling. The foot may have a foolproof finger adapted to be engaged in a recess of the bar when the bar is in the longitudinal position.

The foolproof finger allows guaranteeing the correct positioning of the bar in the longitudinal position.

The bar can be a profile having a rectangular cross-section.

The rectangular cross-section can allow increasing the distance of an accessory fastened on the bar, relative to the roof, by the value of the thickness of the spacer plus the value of the length of the bar rectangular section. Indeed, the rectangular section may for example allow using the side having a small thickness when the bar is in the longitudinal position and using the side having a greater thickness when the bar is in the transverse position, in order to increase the distance between the roof of the vehicle and the accessory fastened to the bar.

The bar has two ends, an insert is positioned at each end.

The insert may have a parallelepiped shape.

The insert can comprise a pivoting cover adapted to at least partially cover the insert.

The insert can have a groove adapted to receive a gooseneck of the cover allowing the cover to pivot relative to the insert.

The cover can have two faces.

BRIEF DESCRIPTION OF THE DRAWINGS

Other characteristics and advantages of the present invention will clearly emerge from the following detailed description of three embodiments of the invention given by way of non-limiting examples, with reference to the appended drawings, in which:

FIG. 2 is a partial exploded perspective view of a roof bar and a foot, FIG. 3 is a partial exploded perspective view of a roof bar and a foot, FIG. 12 is a partial sectional side view of an insert and a roof bar according to the invention, FIG. 13 is a front sectional view of an insert and a roof bar according to the invention.

DETAILED DESCRIPTION

Figure 1:
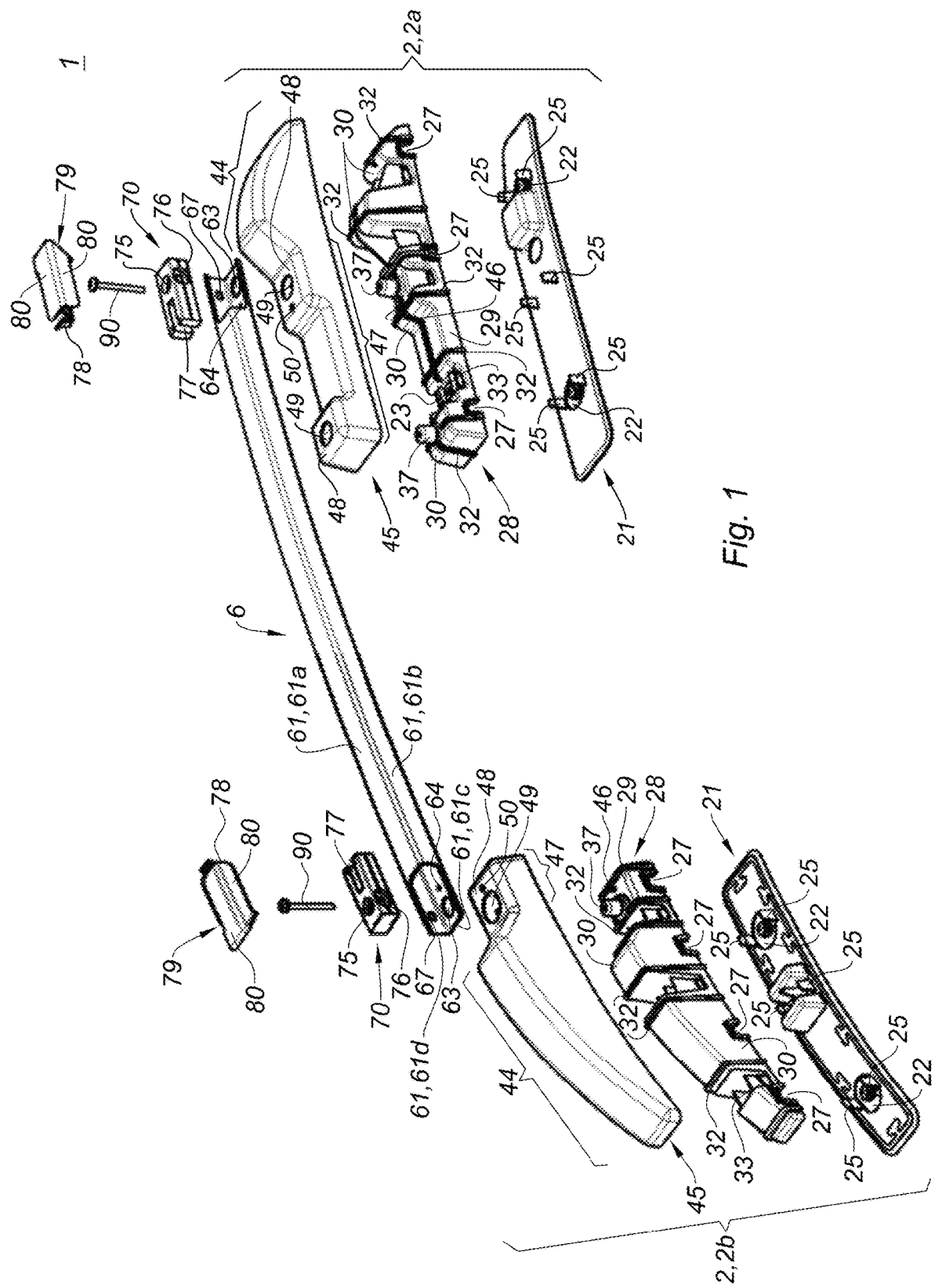
FIG. 1 is an exploded perspective view of a roof bar assembly according to the invention.
Figure 4:
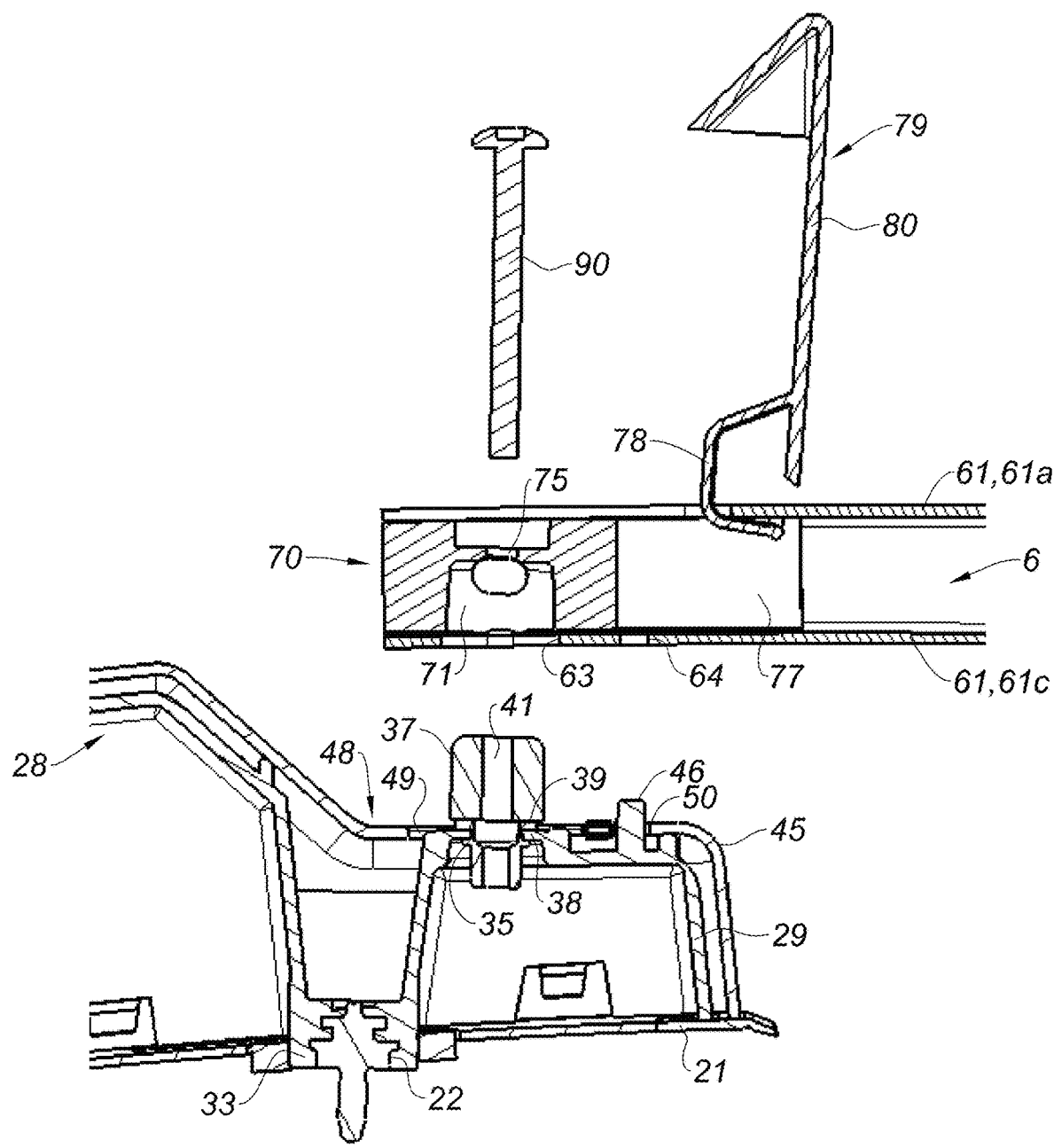
FIG. 4 is an exploded sectional view of the fastening of a roof bar in the longitudinal position.

With reference to FIG. 1, the invention concerns a roof bar assembly 1 comprising in particular two fastening feet 2 and a bar 6. A first foot 2a is intended to be fastened on the roof of a vehicle, at the rear relative to the vehicle advancing direction. A second foot 2b is intended to be fastened on the roof of a vehicle, at the front relative to the vehicle advancing direction.

The feet 2 comprise a fastening platen 21. According to the embodiment presented here, the fastening platen 21 is a substantially rectangular plate. The fastening platen 21 has two apertures 22 adapted to receive screws, staples, or rivets allowing to fasten the fastening platen 21 on the roof of a vehicle. Furthermore, the fastening platen 21 has several snap-fit teeth 25. According to the embodiment presented here, the fastening platen 21 comprises six snap-fit teeth 25. The snap-fit teeth 25 are adapted to be engaged in slots for snap-fitting 27 a framework 28 which will be presented hereinafter. The fastening platen 21 may, for example, be made of a polymer material that can be injected or molded.

As previously stated, each foot 2 comprises a framework 28 adapted to be fastened on the fastening platen 21. The framework 28 is designed to ensure the mechanical strength of the foot 2. The framework 28 comprises a skin 29 having reinforcing structures such as bosses 30 and ribs 32. Furthermore, the framework 28 has snap-fit slots 27 and a fastening aperture 33. The fastening aperture 33 is adapted to be aligned with an aperture 22 of the fastening platen 21 in order to receive a screw, a staple, or a rivet allowing to secure the framework 28, the fastening platen 21 and the roof of the vehicle.

According to the embodiment presented herein, the framework 28 of the first foot 2a comprises two drillings 35 and the framework 28 of the second foot 2b comprises a single drilling 35. The function of the drillings 35 will be detailed later.

Spacer means are fastened at the mouthpiece of each drilling 35. According to the two embodiments presented herein, the spacer means are a spacer 37.

According to the two embodiments presented herein, the spacer 37 is a hollow cylinder made of polymer material comprising a conduit 41. The spacer 37 may have a thickness of 15 millimeters to 30 millimeters and a diameter of 15 millimeters to 25 millimeters. The conduit 41 is adapted to be in the continuity of the drilling 35 when the spacer 37 is fastened to the mouthpiece of the drilling 35.

Figure 10:
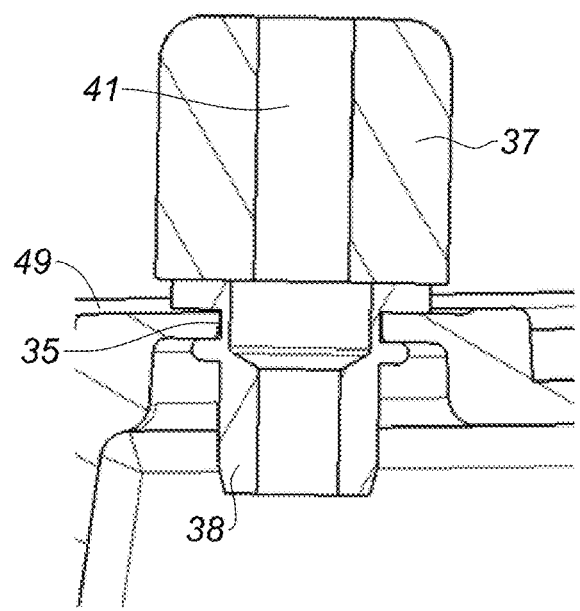
FIG. 10 is a sectional view of a first embodiment of the spacer.

According to the first embodiment of the spacer 37, shown in FIG. 10, the spacer 37 is welded on a clinch nut 38. The clinch nut 38 is clinched at the mouthpiece of the drilling 35.

Figure 11:
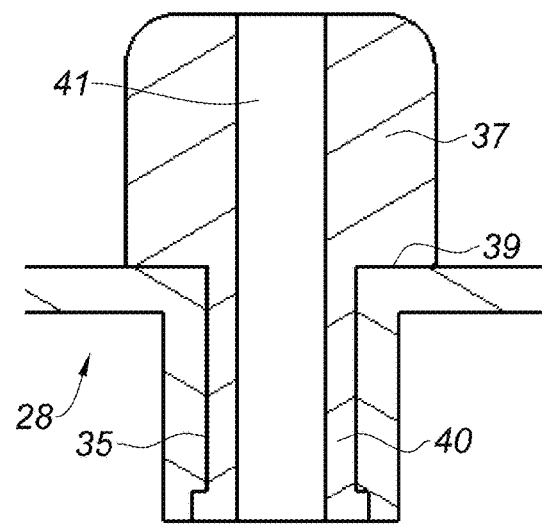
FIG. 11 is a sectional view of a second embodiment of the spacer.

According to the second embodiment of the spacer 37, shown in FIG. 11, the spacer 37 has a shoulder 39 and a portion having a reduced diameter 40 adapted to be positioned into the mouthpiece of the drilling 35. According to the second embodiment, the spacer 37 can be made by machining then shrink-fitted, or can be overmolded, into the mouthpiece of the drilling 35.

Figure 14:
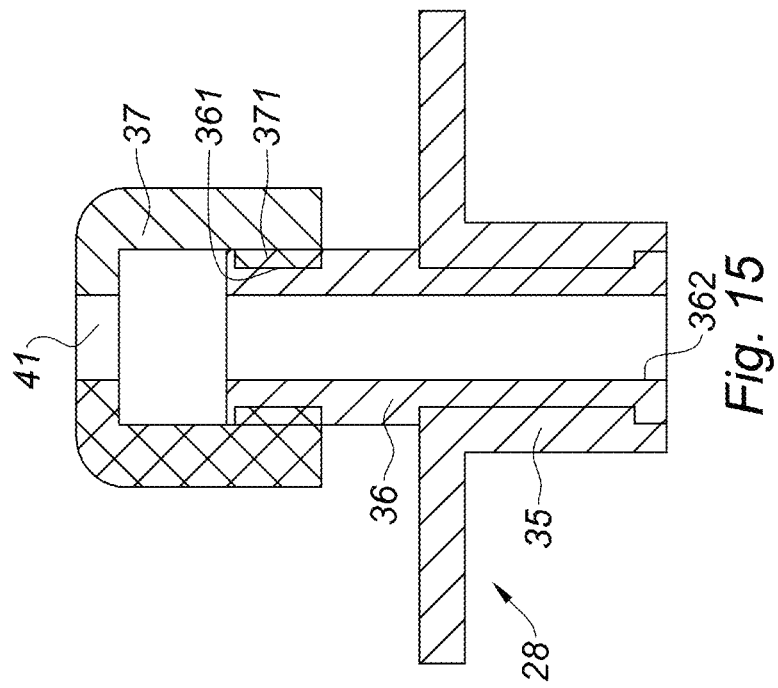
FIG. 14 is a sectional view of a third embodiment of the spacer in a first position.
Figure 15:
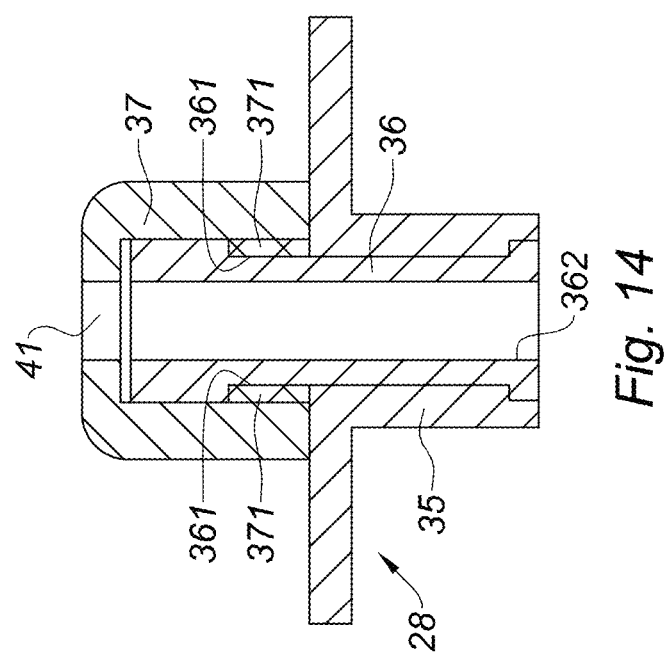
FIG. 15 is a sectional view of a third embodiment of the spacer in a second position.

According to a third embodiment of the spacer 37, shown in FIGS. 14 and 15, the spacer 37 has an internal helical thread 371 adapted to cooperate with a complementary helical thread 361 of a stud 36 emerging from the drilling 35. This third embodiment allows adjusting the position of the spacer 37 by screwing or unscrewing the spacer 37 on the stud 36, between a first position in which the spacer 37 is completely screwed (FIG. 14) and a second position in which the spacer 37 is unscrewed on the stud 36 (FIG. 15). According to this embodiment, the conduit 41 may, for example, have a hexagonal section adapted to cooperate with a tool such as a hexagon socket screw key. This technical arrangement may allow screwing or unscrewing the spacer 37 on the stud 36. The stud 36 has a longitudinal drilling 362 adapted to be in the continuity of the conduit 41. Furthermore, according to this embodiment, the spacer 37 can have a stop (not shown) at one end of the helical thread 371, allowing to maintain the connection between the spacer 37 and the stud 36. In other words, the stop at the end of the helical thread 371 allows prohibiting the separation of the spacer 37 and the stud 36, when the spacer 37 is completely unscrewed.

The framework 28 has a foolproof finger 46, in the proximity and in the alignment of the drilling 35, along a longitudinal axis of the framework 28. The function of the foolproof finger 46 will be presented later.

Each foot 2 further comprises an aspect skin 45. The aspect skin 45 may be made of a polymer material whose color and surface aspect can be adapted to the vehicle on which the foot 2 is to be fastened. According to the embodiment presented herein, the aspect skin 45 has a first half-ellipse-like portion 44. This first portion 44 is adapted to promote the aerodynamics and aesthetics in terms of style of the foot 2. A second portion 47 of the aspect skin 45 has at least one flat surface 48 having an aperture 49 adapted to be traversed by a spacer 37 and a hole 50 adapted to be traversed by a foolproof finger 46. It should be noted that the second portion 47 comprises as many flat surfaces 48, apertures 49 and holes 50 as there are spacers 37 and foolproof fingers 46 on the framework 28.

The roof bar assembly 1 also comprises a bar 6. According to the embodiment presented herein, the bar 6 is a profile having a rectangular cross-section defining four faces 61 with a length 62 between two lateral faces 61b and 61d and a width 65 between an upper face 61a and a lower face 61c. The length 62 has a dimension larger than the dimension of the width 65. The bar 6 may, for example, be made of extruded aluminum. The bar 6 has two ends. According to the embodiment presented herein, each end of the bar 6 has a cutout shortening the subsequent upper face 61a and first lateral face 61b compared to the lower face 61c and second lateral face 61d.

According to other embodiments the bar 6 may not have a cutout.

The lower face 61c has an aperture 63 of diameter larger than the diameter of the spacer 37. The aperture 63 is adapted to be traversed by the spacer 37. In the proximity of the aperture 63, in the alignment of the aperture 63 relative to a longitudinal axis of the bar 6, the bar 6 has a hollow recess 64 adapted to receive the foolproof finger 46. The second lateral face 61d has a drilling 67 having a diameter smaller than the diameter of the spacer 37. It should be noted that the axes of the drilling 67 and the aperture 63 are intersecting and substantially perpendicular.

An insert 70 is positioned in each cutout of the bar 6. According to the embodiment presented herein, the insert 70 has a substantially parallelepipedal geometry. The insert 70 has a bore 71 intended to be positioned facing the aperture 63 for receiving a spacer 37. The bore 71 has a depth 73 approximately equivalent to the thickness of the spacer 37.

A first drilling 75 opens into the bore 71. The first drilling 75 is adapted to receive a screw 90 allowing to fasten the insert 70 and the bar 6 to a foot 2. According to the embodiment presented herein, the first drilling 75 has a counterbore allowing to embed the head of the screw 90. The bore 71 and the first drilling 75 are substantially perpendicular to the upper face 61a and to the lower face 61d of the bar 6.

The insert 70 also has a second drilling 76, perpendicular to the first drilling 75. The second drilling 76 is a through drilling and opens into the drilling 67 of the lateral face 61d. The second drilling 76 is adapted to receive a screw 90 and has a diameter smaller than the diameter of the spacer 37. The second drilling may have a counterbore allowing to embed the head of the screw 90. The second drilling 76 is substantially perpendicular to the first lateral face 61b and to the second lateral face 61d.

Furthermore, the insert 70 has a groove 77 adapted to receive a gooseneck 78 of a cover 79. The cover 79 has two perpendicular faces 80 and a beveled end. The two perpendicular faces 80 of the cover 79 are adapted to hide the insert 70 positioned in the cutout at one end of the bar 6. The gooseneck 78 allows the cover 79 to pivot between an open position in which the insert 70 is visible and accessible and a closed position in which the insert 70 is hidden.

In conditions of use, two roof bar assemblies 1 are fastened to the roof of a vehicle. Assembling the bars 6 to the feet 2 by screws 90 enables the rotation of the bars 6 between a longitudinal position in which each bar 6 is substantially parallel to a longitudinal axis of the vehicle and a transverse position in which each bar 6 is substantially perpendicular to a longitudinal axis of the vehicle.

In the longitudinal position, each bar 6 is fastened to a first foot 2a and to a second foot 2b.

Figure 5:
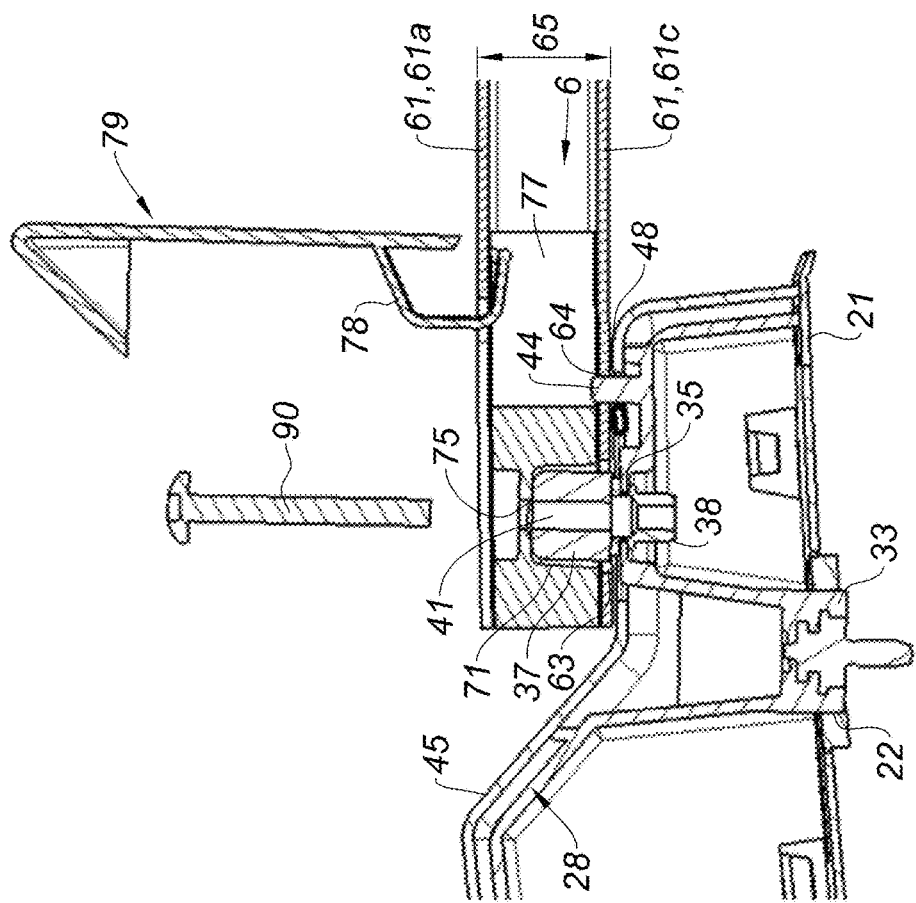
FIG. 5 is a sectional view of the fastening of a roof bar in the longitudinal position, before the introduction of the screw.
Figure 6:
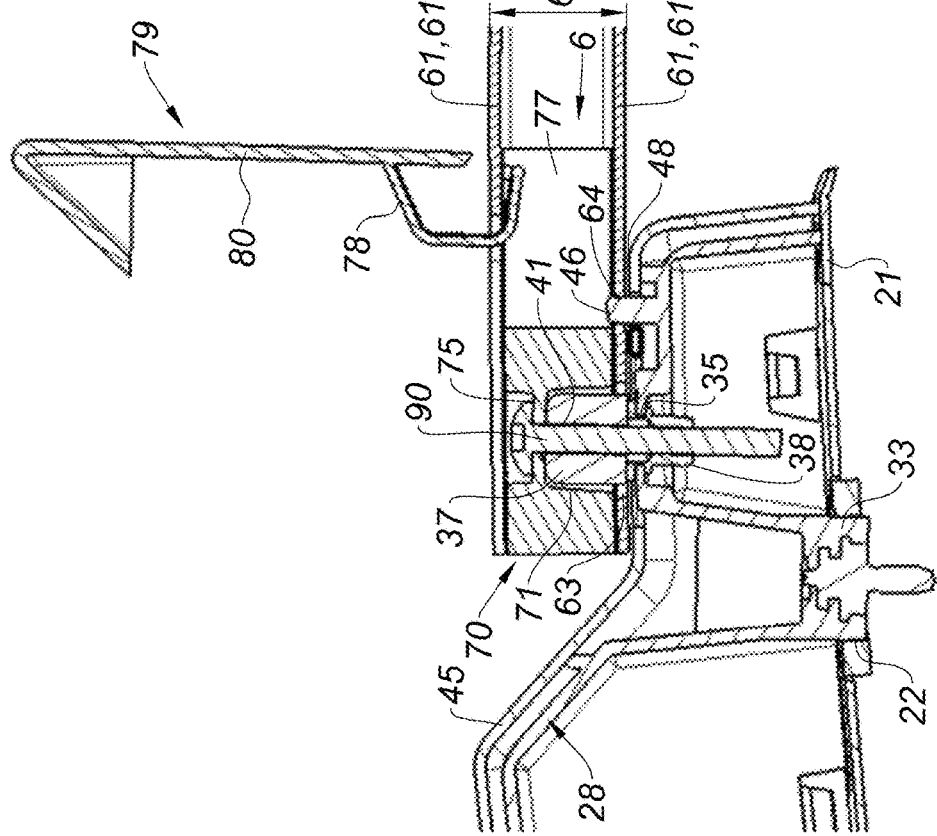
FIG. 6 is a sectional view of the fastening of a roof bar in the longitudinal position.

With reference to FIGS. 5 and 6, in the longitudinal position, the bars 6 are fastened to the feet 2 such that the spacer 37 is positioned in the bore 71 and the foolproof finger 46 is positioned in the recess 64. The fastening screw 90 traverses the first drilling 75, the spacer 37 and the drilling 35 of the foot 2 in order to fasten the bar 6 to the foot 2.

In the transverse position, each bar 6 is fastened either to two first feet 2a, or to two second feet 2b.

Figure 7:
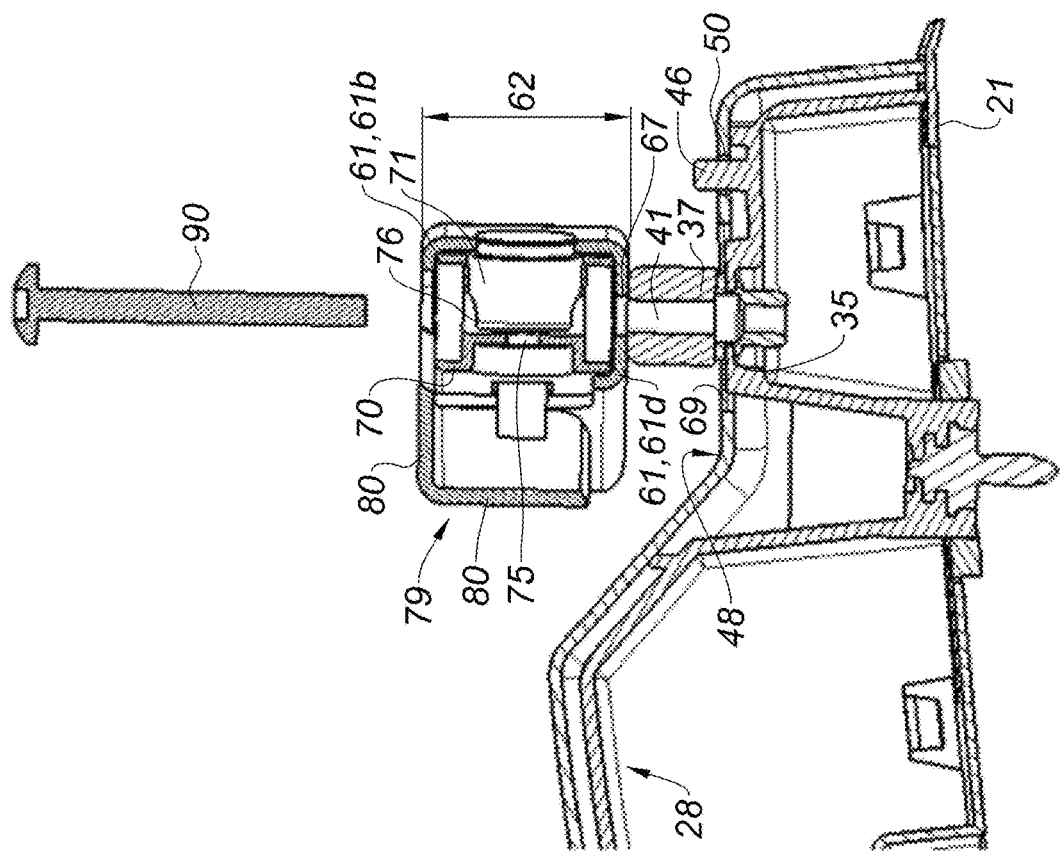
FIG. 7 is a sectional view of the fastening of a roof bar in the transverse position, before introduction of the screw.
Figure 8:
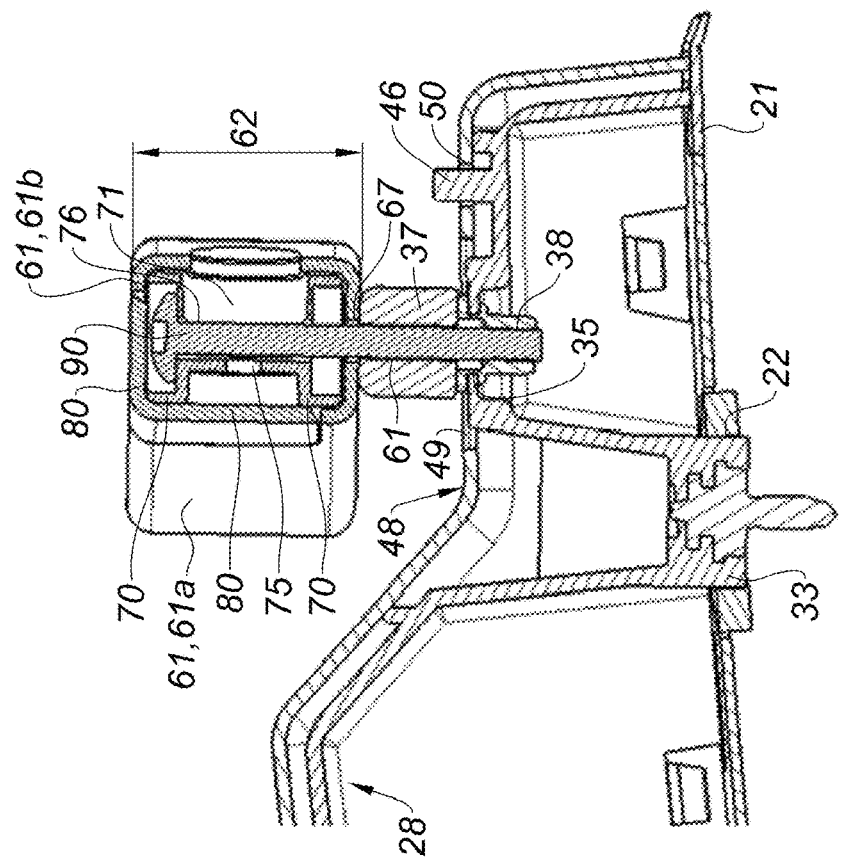
FIG. 8 is a sectional view of the fastening of a roof bar in the transverse position.
Figure 9:
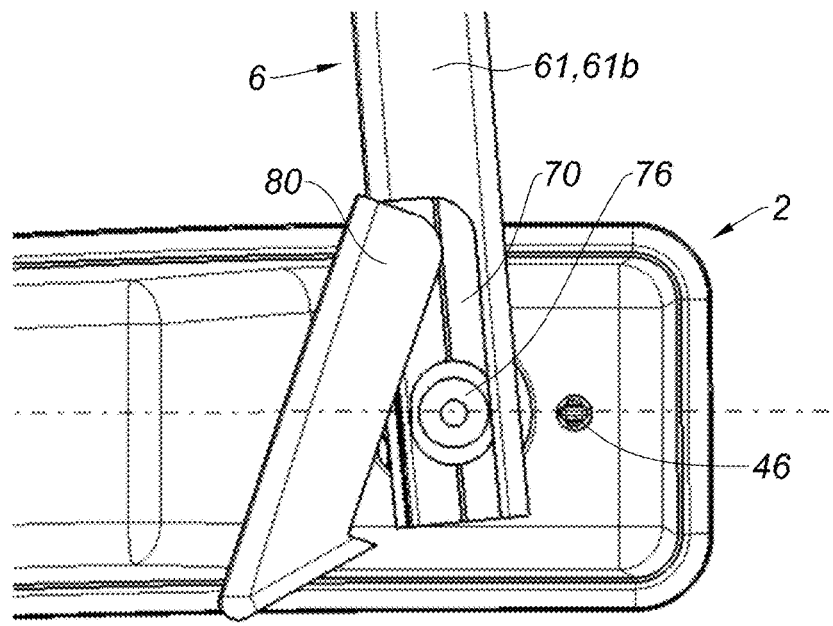
FIG. 9 is a top view of the insert with the open cover.

As shown in FIGS. 7 and 8, in the transverse position, the bar 6 is positioned such that the second lateral face 61d of the bar 6 rests on the spacer 37. In order to assemble the bar 6 to the foot 2, the screw 90 traverses the second drilling 76 of the insert 70, the spacer 37 and the drilling 35. Thus, in the transverse position, the bar 6 is raised by the spacer 37. In other words, in the transverse position, the distance between the bar 6 and the foot 2 fastening platen 21 is larger than the distance between the bar 6 in the longitudinal position and the foot 2 fastening platen 21 by the value of the thickness of the spacer 37. Furthermore, the rectangular section of the bar 6 allows increasing the distance of an accessory fastened on the bar 6, relative to the roof, by the value of the thickness of the spacer 37 supplemented with the difference between the length 62 and the width 65 of the bar 6.

In addition, according to the third embodiment of the spacer, it is possible to adjust the distance between the bar 6 in the longitudinal position and the foot 2 fastening platen 21, by screwing or unscrewing the spacer 37 on the stud 36.

Thus, the invention provides a roof bar assembly 1 that can pivot while allowing the distance between the roof and the roof bar 1 to be varied, using a simple, lightweight and robust mechanism.

The presence of two drillings 35 and two spacers 37 on the first feet 2a allows the distance between two bars 6 in the transverse position to be varied, by transversely displacing the bar 6 fastened to the first feet 2a.

Of course, the invention is not restricted to the sole embodiments shown above, but it embraces, on the contrary, all the embodiments.

The invention claimed is:

1. A roof bar assembly comprising:
    a bar,
    a first foot and a second foot for fastening the bar to a roof of a vehicle, and
    screws for fastening the bar to the first foot and the second foot, the bar can be fastened in a longitudinal position in which the bar is parallel to a longitudinal axis of the vehicle or in a transverse position in which the bar is perpendicular to the longitudinal axis of the vehicle,
    wherein the bar is configured so that in the transverse position, a distance between a foot fastening platen intended to be fastened to the roof and the bar is larger than a distance between the foot fastening platen and the bar in the longitudinal position,
    a spacer positioned on the first foot and the second foot, and
    an insert connected to the bar, the insert having a bore adapted to receive one of the spacers when the bar is in the longitudinal position, a first drilling opening into the bore for receiving one of the screws for fastening the bar in the longitudinal position and a second drilling opening whose diameter is smaller than a diameter of the spacer for receiving one of the screws for fastening the bar in the transverse position.

2. The roof bar assembly according to claim 1, wherein the spacer has a helical thread adapted to cooperate with a complementary helical thread of the first foot and the second foot to adjust the distance between the foot fastening platen and the bar in the transverse position.

3. The roof bar assembly according to claim 2, wherein the first opening drilling is perpendicular to the second opening drilling.

4. The roof bar assembly according to claim 3, wherein the first foot and the second foot has a foolproof finger adapted to be engaged in a recess of the bar when the bar is in the longitudinal position.

5. The roof bar assembly according to claim 4, wherein the bar is a profile having a rectangular cross-section.

6. The roof bar assembly according to claim 5, wherein the bar has two ends, and the insert is a pair of inserts positioned at each end of the bar.

7. The roof bar assembly according claim 6, wherein the pair of inserts have a parallelepiped shape.

8. The roof bar assembly according to claim 7, wherein each insert of the pair of inserts comprises a pivoting cover adapted to at least partially cover each insert of the pair of inserts.

9. The roof bar assembly according to claim 2, wherein the first foot and the second foot has a foolproof finger adapted to be engaged in a recess of the bar when the bar is in the longitudinal position.

10. The roof bar assembly according to claim 1, wherein the first drilling opening is perpendicular to the second drilling opening.

11. The roof bar assembly according to claim 10, wherein the first foot and the second foot has a foolproof finger adapted to be engaged in a recess of the bar when the bar is in the longitudinal position.

12. The roof bar assembly according to claim 1, wherein the first foot and the second foot has a foolproof finger adapted to be engaged in a recess of the bar when the bar is in the longitudinal position.

13. The roof bar assembly according to claim 1, wherein the bar is a profile having a rectangular cross-section.

14. The roof bar assembly according to claim 1, wherein the bar has two ends, and the insert is a pair of inserts positioned at each end of the bar.

15. The roof bar assembly according claim 1, wherein the insert has a parallelepiped shape.

16. The roof bar assembly according to claim 1, wherein the insert comprises a pivoting cover adapted to at least partially cover the insert.

17. The roof bar assembly according to claim 16 wherein the insert has a groove adapted to receive a gooseneck of the pivoting cover allowing the pivoting cover to pivot relative to the insert.

18. The roof bar assembly according to claim 16, wherein the pivoting cover has two perpendicular faces.

* * * * *